(12) United States Patent
Tong et al.

(10) Patent No.: US 7,609,264 B2
(45) Date of Patent: Oct. 27, 2009

(54) SHELL RADIANCE TEXTURE FUNCTION

(75) Inventors: Xin Tong, Beijing (CN); Yanyun Chen, Beijing (CN); Baining Guo, Beijing (CN); Heung-Yeung Shum, Beijing (CN); Stephen Lin, Beijing (CN); Ying Song, Beijing (CN)

(73) Assignee: Microsoft Corporation, Redmond, WA (US)

( * ) Notice: Subject to any disclaimer, the term of this patent is extended or adjusted under 35 U.S.C. 154(b) by 123 days.

(21) Appl. No.: 11/277,935

(22) Filed: Mar. 29, 2006

(65) Prior Publication Data

US 2007/0229502 A1    Oct. 4, 2007

(51) Int. Cl.
    *G06T 15/00*    (2006.01)
(52) U.S. Cl. ...................................... 345/426; 345/428
(58) Field of Classification Search .................. 345/426, 345/428
    See application file for complete search history.

(56) References Cited

U.S. PATENT DOCUMENTS

2006/0028468 A1    2/2006    Chen et al. ................... 345/426

OTHER PUBLICATIONS

Shi et al., Shell Radiance Texture Function, Visual Cimput, Aug. 2005, pp. 774-782.*
P. Blasi, B. Le Saec, and C. Schlick. An Importance Driven Monte-Carlo Solution to the Global Illumination Problem. In: Eurographics Workshop on Rendering, pp. 173-183, 1994.
R.L Cook: Shade Trees. In: Computer Graphics, pp. 223-331, 1984.
N.A. Carr, J.D. Hall, and J.C. Hart: GPU Algorithms for Radiosity and Subsurface Scattering. In:Proc. Graphics Hardware, 2003, pp. 51-59.
Y. Chen, X. Tong, J. Wang, S. Lin, B. Guo and H.Y. Shum. : Shell Texture Functions. In: Proc. ACM SIG-GRAPH, pp. 343-353, 2004.
K.J. Dana, B.V. Ginneken, S.K. Nayar, and J.J. Koen-Derink. : Reflectance and Texture of Real-World Surfaces. In: ACM Transactions on Graphics, 1999.
C. Dachsbacher and M. Stammingerz: Translucent Shadow Maps. In: Rendering Techniques, pp. 197-201, 2003.
M. Goesele, H.P.A. Lensch, J. Lang, C. Fuchs, H. Seidel.: DISCO—Acquisition of Translucent Objects. In Proc. ACM SIG-GRAPH, pp. 835-844, 2004.
X. Hao, T. Baby, and A. Varshney.: Interactive subsurface scattering for translucent meshes. In: Symposium on Interactive 3D Graphics, pp. 75-82, 2003.
X. Hao and A. Varshney.: Real-time rendering of translucent meshes. In: ACM Transactions on Graphics, vol. 23, pp. 120-142, 2004.
H.W. Jensen and J. Buhler: A rapid hierarchical rendering technique for translucent materials. In: ACM Transaction on Graphics 21(3), pp. 576-581, 2002.
H.W. Jensen and P. H. Christensen. Efficient simulation of light transport in scenes with participating media using photon maps. In: Proc. ACM SIGGRAPH, pp. 311-320., 1998.
H.W. Jensen, S.R. Marschner, M. Levoy, and P. Hanrahan.: A practical model for subsurface light transport. In Proc. ACM SIGGRAPH, pp. 511-518, 2001.
H.P.A. Lensch, M. Goesele, P. Bekaert, J. Kautz, M.A.Magnor, J. Lang, H.P. Seidel.: Interactive rendering of translucent objects. In: Proc. Pacific Graphics, pp. 214-224, 2002.

(Continued)

*Primary Examiner*—Phu K Nguyen

(57) ABSTRACT

A shell radiance texture function (SRTF) is defined to record an outgoing radiance from a base volume of an object to be rendered. Using the SRTF, radiance values are precomputed and stored for the base volume. The object is rendered using the precomputed radiance values.

19 Claims, 6 Drawing Sheets

OTHER PUBLICATIONS

E.P. Lafortune and Y.D. Willems.: Rendering Participating Media with Bidirectional Path Tracing. In: Rendering Techniques, pp. 91-100, 1996.

G. Muller, J. Meseth, M. Sattler, R. Sarlette, R. Klein.: Acquisition, Synthesis and Rendering of Bidirectional Texture Functions. In: Computer Graphics forum, vol. 24, No. 1, pp. 83-109, 2005.

G. Muller, J. Meseth, R. Klein.: Fast Environmental Lighting for Local-PCA Encoded BTFs. In: proceedings of Computer Graphics International, pp. 198-205, 2004.

W-C. MA, S-H. Chao, Y-T. Tseng, Y-Y.Chuang, C-F Chang, B-Y. Chen and M. Ouhyoung.: Level-of-detail Representation of Bidirectional Texture Functions for Real-time Rendering. In: Proceedings of the 2005 Symposium on Interactive 3D Graphics and Games, pp. 187-194, 2005.

F. Neyret.: Modeling, Animating, and Rendering Complex Scenes Using Volumetric Textures. In: IEEE Trans. Visual Computer Graphics, 4(1), pp. 55-70, 1998.

S. Premoze, M. Ashikhmin, J. Tessendorf, R. Ramamoorthi, and S. Nayar.: Practical rendering of multiple scattering effects in participating media. In: Eurographics Symposium on Rendering, 2004.

M. Sattler, R. Sarlette, and R. Klein, Efficient and realistic visualization of cloth. In: Proceedings of Eurographics Symposium on Rendering, pp. 167-177, 2003.

P.P. Sloan, J. Hall, J. Hart, and J. Snyder.: Clustered principal components for precomputed radiance transfer. In: ACM Transactions on Graphics, vol. 22-3, pp. 382-391, 2003.

P.P. Sloan, X. Liu, H.Y. Shum, and J. Snyder.: Bi-scale radiance transfer. In: ACM Transactions on Graphics, vol. 22-3, 2003.

J. Stam.: Multiple Scattering as a Diffusion Process. In: Rendering Techniques, pp. 41-50, 1995.

D. Wood, D. Azuma, W. Aldinger, B. Curless, T. Duchamp, D. Salesin, and W. Stuetzle.: Surface light fields for 3D photography. In: Proc. ACM SIGGRAPH, 2000.

X. Wang, X. Tong, S. Lin, S. Hu, B. Guo, H.-Y. Shum: Generalized displacement mapping, In: Proc. Eurographics Symposium on Rendering, 2004.

L.Wang, X.Wang, X. Tong, S. Hu, B. Guo, H.-Y. Shum: View-dependent displacement mapping. In: Proc. ACM SIGGRAPH, 2003.

Ying Song et al., "Shell Radiance Texture Functions", The Visual Computer, Pacific Graphics, 2005.

* cited by examiner

Base Volume 202    $f_{shell}$ 204

$f_{core}$ 206    Base Volume 202

SHELL RADIANCE TEXTURE FUNCTION

BACKGROUND

Translucent materials are widely used in computer graphics related industries including video games and digital films. Typical translucent material rendering techniques are very time consuming, especially for inhomogeneous translucent materials with complex surface mesostructures. This inefficiency may prevent the inhomogeneous materials from being used in gaming and other applications.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Described herein are various technologies and techniques directed to methods and systems for shell radiance texture functions. In accordance with one implementation of the described technologies, a shell radiance texture function (SRTF) is defined to record an outgoing radiance from a base volume of an object to be rendered. Using the SRTF, radiance values are precomputed and stored for the base volume. The object is rendered using the precomputed radiance values.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
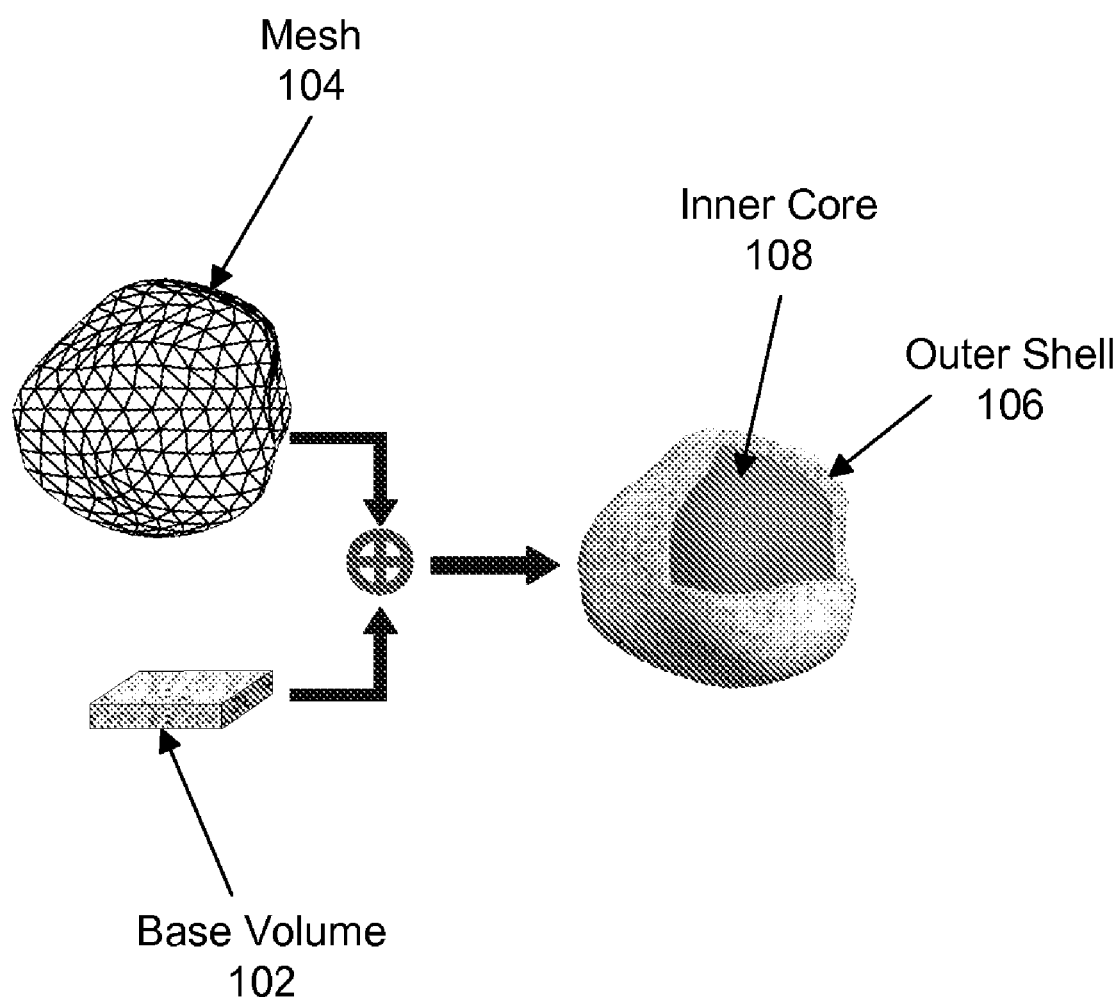
FIG. 1 illustrates an exemplary representation of a two-layer model of an object.

FIG. 1 is an exemplary representation of a two-layer model of an inhomogeneous translucent object. A base volume 102 is synthesized onto a target mesh 104 to form the two-layered model that includes an inhomogeneous shell 106 and a homogeneous core 108. An example of this type of model representation is described by Y. Chen, X. Tong, J. Wang, S. Lin, B. Guo, and H. Y. Shum ("Shell Texture Functions" in *Proceedings of ACM SIGGRAPH* 2004, pp. 343-353).

The shell 106 is formed by texture synthesis of a volumetric material sample represented by base volume 102. Base volume 102 contains an array of voxels on a three-dimensional (3-D) grid. A voxel refers to a 3-D pixel volume near the surface of the shell of the object to be modeled and/or rendered. Base volume 102 is made up of three different types of voxels: free space, mesostructure surface, and subsurface layer. Mesostructure surface voxels record the complex geometry information, subsurface layer voxels indicate the inhomogeneous and translucent property of the material, and free space voxels are blank voxels.

The Shell Radiance Texture Function (SRTF) is precomputed from the base volume with the following material properties for each voxel: extinction coefficient $\sigma_t$, albedo $\alpha$, which is a fraction of the incident radiation that is reflected by the surface of the material sample, and phase function $p(\overline{\omega}, \overline{\omega}')$. The scattering coefficient is related to the extinction coefficient by $\sigma_s = \alpha \sigma_t$. The transmittance between x and x' is defined as $$\tau(x, x') = e^{-\int_x^{x'} \sigma_t(u) du}$$

SRTF is defined on a reference plane that lies on top of the base volume and records the outgoing radiance from the base volume for all viewing and lighting directions. At rendering time, the precomputed SRTF is directly obtained from the object surface.

Figure 2A:
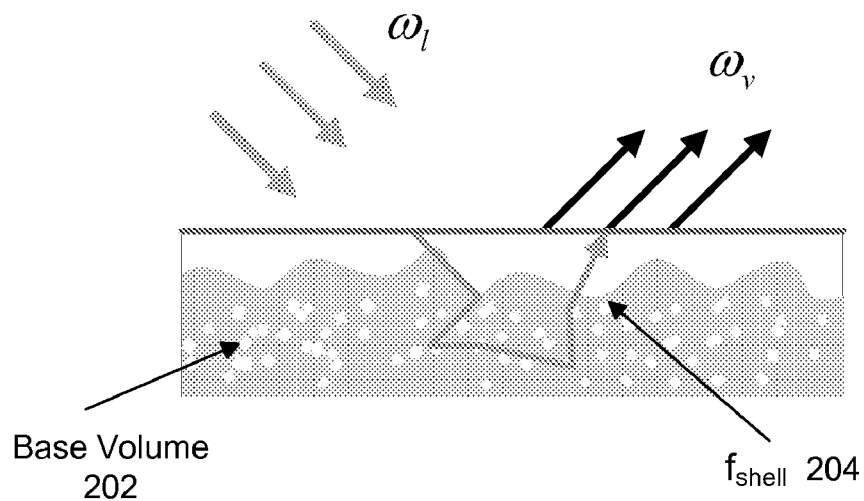
FIG. 2A illustrates an exemplary representation of the SRTF component $f_{shell}$.
Figure 2B:
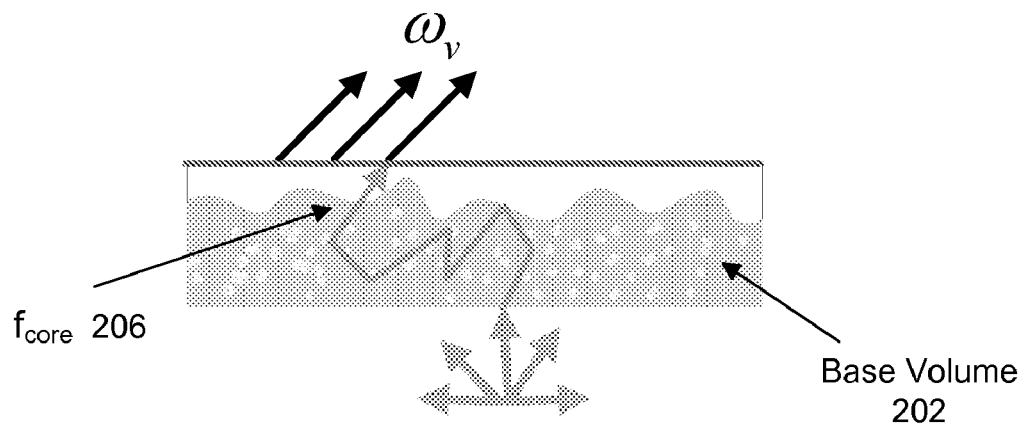
FIG. 2B illustrates an exemplary representation of the SRTF component $f_{core}$.

The SRTF is composed of two components, $f_{shell}$ 204 (illustrated in FIG. 2A) and $f_{core}$ 206 (illustrated in FIG. 2B). For each incoming light ray along lighting direction $\omega_l = (\theta_l, \phi_l)$ that samples the upper hemisphere of a base volume 202, the outgoing radiance towards viewing direction $\omega_v = (\theta_v, \phi_v)$ is represented by $f_{shell}(x, y, \theta_v, \theta_l, \phi_l)$, where (x, y) is a sampling point on the reference plane. $f_{shell}$ records scattering effects within the base volume and inter-reflection, masking, and shadowing effects caused by the surface mesostructure.

As illustrated in FIG. 2B, $f_{core}$ models radiance in the outgoing direction due to light arriving from the lower hemisphere and may be represented by $f_{core}(x, y, \theta_v, \phi_v)$. In rendering, the backlighting from the lower hemisphere comes from the diffuse radiance of the homogeneous inner core. Therefore, $f_{core}$ is related only to the viewing direction and is independent of the lighting direction.

Figure 3:
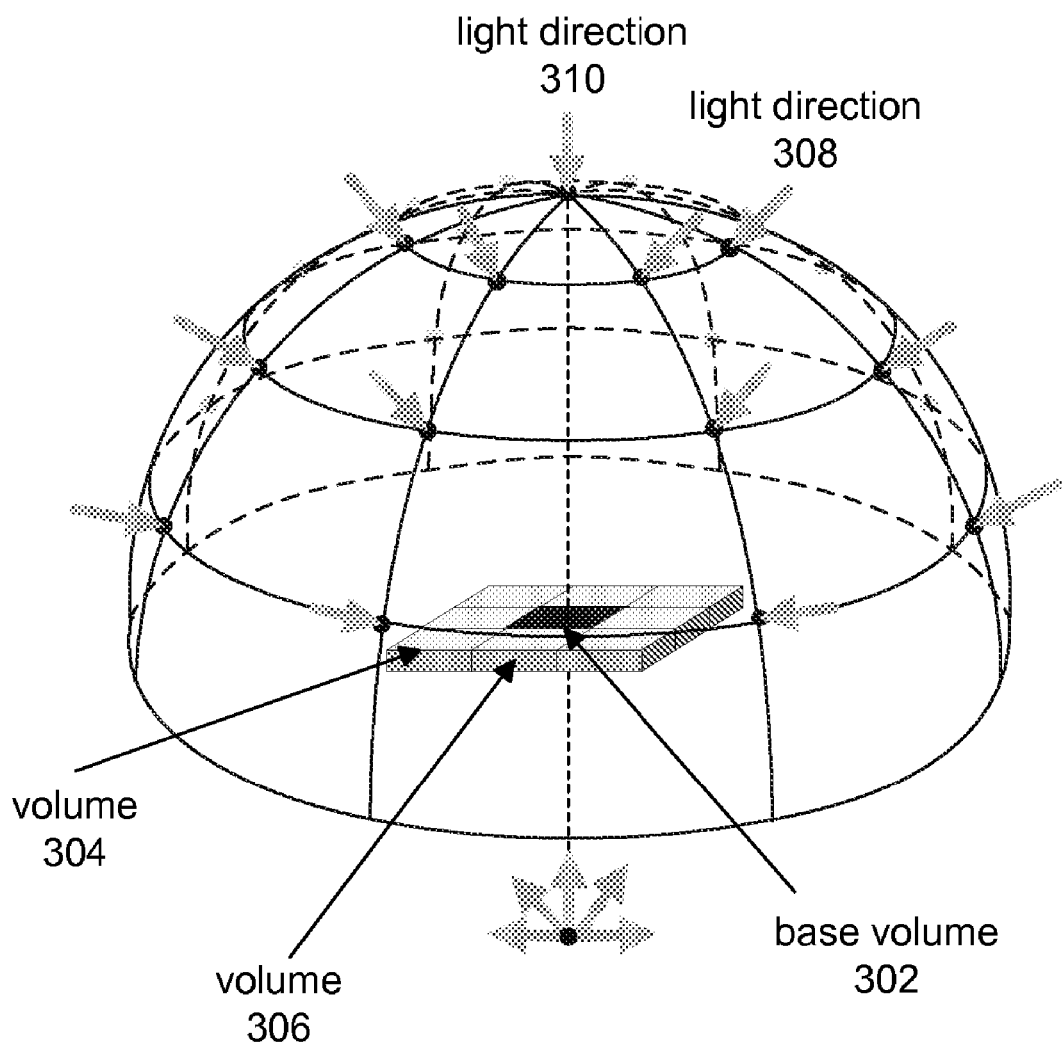
FIG. 3 illustrates an exemplary representation of a base volume model to compute SRTF using photon mapping.

FIG. 3 shows an exemplary representation of a base volume model to compute SRTF using photon mapping. The sampling lighting directions and viewing directions are uniformly distributed on the hemisphere. For sampled illumination directions, $f_{shell}$ may be computed in two steps using the material properties of the base volume 302. First, photon mapping may be used to compute the in-scattered radiance within the volume and irradiance on the mesostructure surface. An example of an algorithm that may be used for the photon mapping is disclosed by H. W. Jenson and P. H. Christensen ("Efficient Simulation of Light Transport in Scenes with Participating Media Using Photon Maps" in

*Proceedings of ACM SIGGRAPH* 1998, pp. 311-320). From the mapped photons, the surface radiance for each viewing direction is evaluated by ray tracing. $f_{core}$ may be modeled in a similar manner by using diffuse light from the entire lower hemisphere.

In the sampling stage, the photon tracing is performed for a set of sampling light directions shown by the arrows, such as 308 or 310, in FIG. 3. For each lighting direction, a large number of photons are traced and their contributions are summed up in each voxel of the base volume. The light coming from the lower hemisphere is also sampled so that the backlight can be handled in the rendering stage. The SRTF values are evaluated for each viewing direction.

To avoid boundary effects in sampling where photons exit the base volume 302 out the sides, the base volume 302 may be surrounded by other identical volumes, such as 304 or 306, as shown in FIG. 3. In the example of FIG. 3, the base volume is surrounded by eight other identical volumes, but such number may vary in alternative embodiments.

Using the base volume and target mesh shown in FIG. 1, the base volume is mapped or synthesized onto the target mesh to form the two-layered model. In synthesis, the top voxels of the base volume are aligned with the target mesh surfaces. Each surface point on the target mesh is assigned a texture coordinate and corresponds to a point on the reference plane. As a result, the SRTF values associated with the reference plane are assigned to the surface.

Figure 4A:
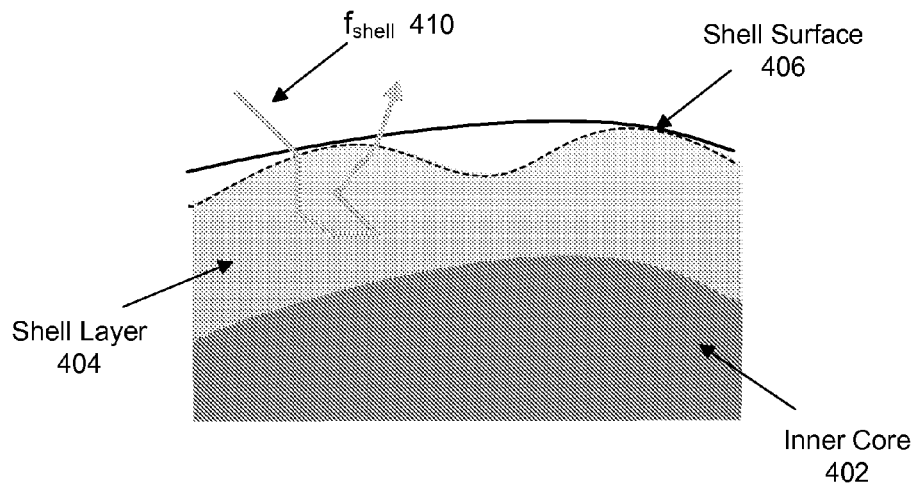
FIG. 4A illustrates an exemplary representation of radiance from light scattered within the shell.
Figure 4B:
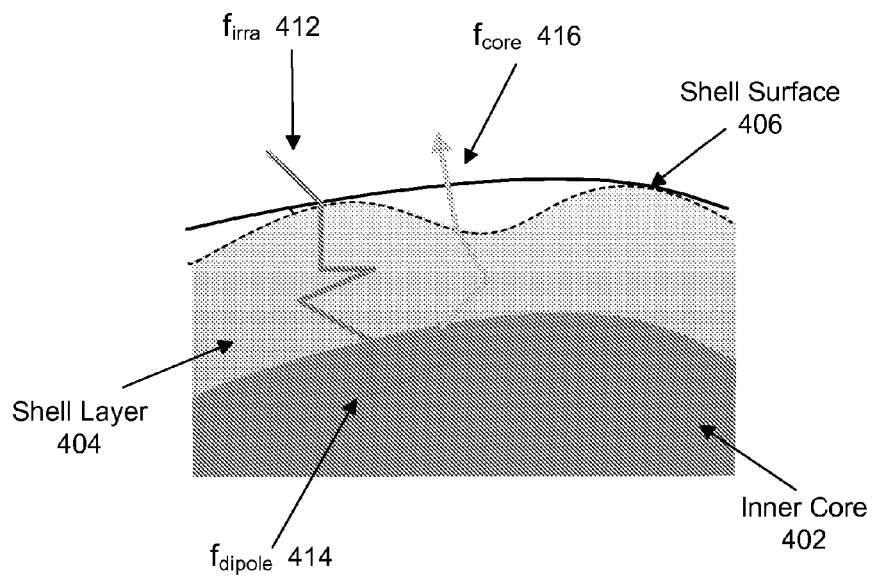
FIG. 4B illustrates an exemplary representation of radiance from light scattered through the core.

Based on the two-layered model, the surface radiance may be divided into two parts: radiance from light scattered only within the shell (as shown in FIG. 4A) and radiance from light scattered through the core (as shown in FIG. 4B). Using $f_{shell}$ 410, surface radiance from shell scattering can be directly evaluated at run time. To compute light scattered from the inner core, the precomputed core radiance $L_c$ may be combined with $f_{core}$ 416, which models the scattering of light from the inner core 402 through the outer shell 404.

As shown in FIG. 4B, the core radiance is a combination of $f_{irra}$ 412 and $f_{dipole}$ 414. To precompute the core radiance for incident light on the surface 406, the effects of light transmission through the shell are accounted for in order to compute the core irradiance. To accelerate the core irradiance computation, $f_{irra}(x, y, \theta_l, \phi_l)$ may be precomputed. For each sampled light direction from $\omega_l=(\theta_l, \phi_l)$, $f_{irra}$ 412 records the multiple scattering irradiance arriving at each voxel (x, y) that is on the bottom level of the base volume. This irradiance value is sampled from the base volume by photon mapping and then used in the core radiance precomputation.

Since multiple scattering is dominant in the homogeneous inner core, a dipole diffusion approximation may be used to compute the core radiance $L_c$ from the core irradiance. One example of such an approximation is described by H. W. Jensen, S. R. Marschner, M. Levoy, and P. Hanrahan ("A Practical Model for Subsurface Light Transport" in *Proceedings of ACM SIGGRAPH* 2001, pp. 511-518).

For incoming illumination from direction $\omega_l$, the core radiance $L_c$ at a surface point $x_o$ may be computed by:

$$L_c(x_o, \omega_l) \approx \frac{1}{\pi} \int_A R_d \|x_i - x_o\| f_{irra}(T(x_i), \omega'_l) V(x_i, \omega_l) L(\omega_l) d(A(x_i))$$

$x_i$ is a point on the surface, $A(x_i)$ is a small area around $x_i$, $V(x_i, \omega_l)$ is the visibility of light at $x_i$, $\omega'_l$ is the light direction computed in the local coordinate frame at $x_i$, and $T(x_i)$ is the texture coordinate of $x_i$. The entire sphere of incoming directions may be sampled uniformly and the above integral may be precomputed for each sampled light direction. Due to the homogeneity of the inner core, the resulting radiance varies slowly over the surface. Therefore, the core radiance $L_c$ may be precomputed on each mesh vertex. The set of precomputed integrals may then be compressed on each vertex using spherical harmonics. In rendering, $L_c$ is reconstructed from a dot product with spherical harmonic lighting coefficients.

During rendering, the SRTF values and the precomputed core radiance $L_c$ may be used to compute the surface radiance at run time by combining the radiance contributions from the shell and the core according to the following:

$$L(x, \omega_o) = \int_\Omega (f_{shell}(T(x), \omega_v, \omega_l) + f_{core}(T(x), \omega_v)L_c(x, \omega_l))L(\omega_l)d\omega_l$$

x is a surface point, T(x) is the texture coordinate of x, and $\omega_v$ is the viewing direction of x.

Figure 5:
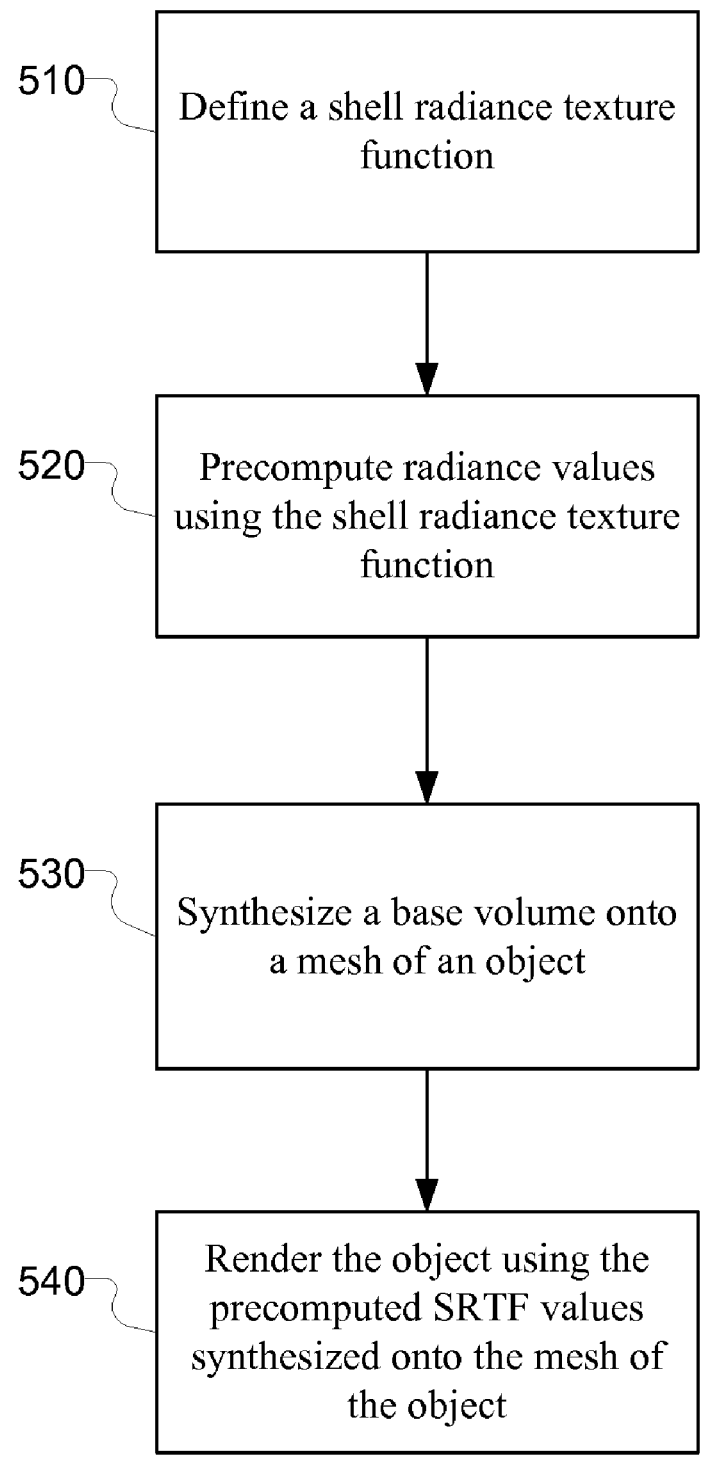
FIG. 5 is a flow diagram of an exemplary method for SRTF.

FIG. 5 is a flow diagram illustrating an exemplary process for SRTF. While the description of FIG. 5 may be made with reference to other figures, it should be understood that the exemplary process illustrated in FIG. 5 is not intended to be limited to being associated with the systems or other contents of any specific figure or figures. Additionally, it should be understood that while the exemplary process of FIG. 5 indicates a particular order of operation execution, in one or more alternative implementations, the operations may be ordered differently. Furthermore, some of the steps and data illustrated in the exemplary process of FIG. 5 may not be necessary and may be omitted in some implementations. Finally, while the exemplary process of FIG. 5 contains multiple discrete steps, it should be recognized that in some environments some of these operations may be combined and executed at the same time.

At 510, the SRTF is defined to record an outgoing radiance from a base volume of an object to be rendered. As described above, the SRTF includes the two components $f_{shell}$ and $f_{core}$. At 520, SRTF values are precomputed. A core radiance $L_c$ may also be precomputed. The precomputation steps and equations are described in detail above with respect to FIGS. 2-4. At 530, a base volume is synthesized onto a target mesh of the object to be rendered. The top voxels of the base volume are aligned with the target mesh surfaces. Each surface point on the target mesh is assigned a texture coordinate and corresponds to a point on the reference plane. As a result, the SRTF values associated with the reference plane are assigned to the surface. At 540, the object is rendered using the precomputed SRTF values synthesized onto the mesh of the object. The surface radiance may be computed by combining the radiance contributions from the shell and the core using the SRTF values and the precomputed core radiance $L_c$.

Figure 6:
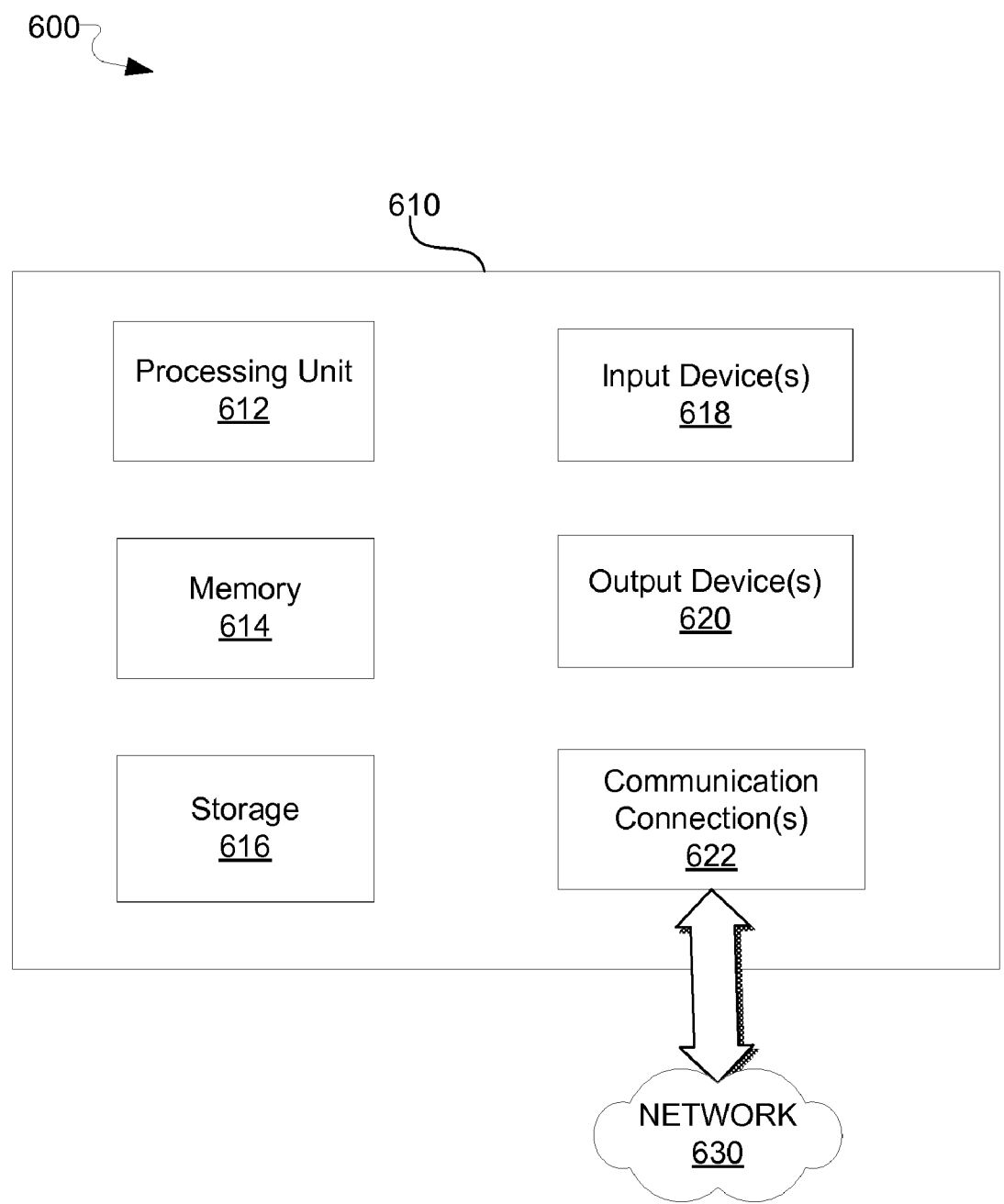
FIG. 6 illustrates an exemplary computing environment in which certain aspects of the invention may be implemented.

FIG. 6 illustrates an exemplary computing environment in which certain aspects of the invention may be implemented. It should be understood that computing environment 600 is only one example of a suitable computing environment in which the various technologies described herein may be employed and is not intended to suggest any limitation as to the scope of use or functionality of the technologies described herein. Neither should the computing environment 600 be interpreted as necessarily requiring all of the components illustrated therein.

The technologies described herein may be operational with numerous other general purpose or special purpose computing environments or configurations. Examples of well known computing environments and/or configurations that may be suitable for use with the technologies described herein include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

With reference to FIG. 6, computing environment 600 includes a general purpose computing device 610. Components of computing device 610 may include, but are not limited to, a processing unit 612, a memory 614, a storage device 616, input device(s) 618, output device(s) 620, and communications connection(s) 622.

Processing unit 612 may include one or more general or special purpose processors, ASICs, or programmable logic chips. Depending on the configuration and type of computing device, memory 614 may be volatile (such as RAM), non-volatile (such as ROM, flash memory, etc.) or some combination of the two. Computing device 610 may also include additional storage (removable and/or non-removable) including, but not limited to, magnetic or optical disks or tape. Such additional storage is illustrated in FIG. 6 by storage 616. Computer storage media includes volatile and nonvolatile, removable and non-removable media implemented in any method or technology for storage of information such as computer readable instructions, data structures, program modules or other data. Memory 614 and storage 616 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 610. Any such computer storage media may be part of computing device 610.

Computing device 610 may also contain communication connection(s) 622 that allow the computing device 610 to communicate with other devices, such as with other computing devices through network 630. Communications connection(s) 622 is an example of communication media. Communication media typically embodies computer readable instructions, data structures, program modules or other data in a modulated data signal such as a carrier wave or other transport mechanism and includes any information delivery media. The term 'modulated data signal' means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes storage media.

Computing device 610 may also have input device(s) 618 such as a keyboard, a mouse, a pen, a voice input device, a touch input device, and/or any other input device. Output device(s) 620 such as one or more displays, speakers, printers, and/or any other output device may also be included.

While the invention has been described in terms of several exemplary implementations, those of ordinary skill in the art will recognize that the invention is not limited to the implementations described, but can be practiced with modification and alteration within the spirit and scope of the appended claims. The description is thus to be regarded as illustrative instead of limiting.

The invention claimed is:

1. A method performed by a computing device comprising a processor and memory, the method comprising:
    accessing a base volume stored in the memory, the base volume modeling translucent material, the base volume comprising voxels that represent geometry and voxels that represent translucence properties of the material being modeled;
    accessing a mesh model stored in the memory;
    mapping the base volume to the mesh model to form a two-layered model stored in the memory, the two-layered model comprising a shell and a core;
    precomputing, by the processor, by sampling light rays entering the base volume, shell radiance texture function (SRTF) values to represent outgoing radiance of the base volume, where, as a result of the mapping of the base volume to the mesh model, the SRTF values are aligned with the shell of the two-layered model, the SRTF values recording scattering effects of the light rays within the base volume;
    storing the SRTF values in the memory; and
    precomputing, from the two-layered model, core radiance comprising radiance of the core, and storing the core radiance in the memory;
    computing, at run time, surface radiance of the two-layered model based on light incident to the two-layered model, the SRTF values, and the precomputed core radiance stored in the memory, and using the surface radiance to render the two-layered model.

2. The method of claim 1, wherein the SRTF values include radiance in an outgoing direction from light arriving from an upper hemisphere of the two-layered model.

3. The method of claim 2, wherein the radiance in the outgoing direction from light arriving from the upper hemisphere is computed with a six-dimensional function.

4. The method of claim 3, wherein the six-dimensional function includes a sampling point on a reference plane.

5. The method of claim 3, wherein the six-dimensional function includes a viewing direction.

6. The method of claim 3, wherein the six-dimensional function includes a lighting direction.

7. The method of claim 1, wherein the SRTF values include radiance in an outgoing direction from light arriving from a lower hemisphere of the two-layered model.

8. The method of claim 7, wherein the radiance in the outgoing direction from light arriving from the lower hemisphere of the two-layered model is computed with a four-dimensional function.

9. The method of claim 8, wherein the four-dimensional function includes a sampling point on a reference plane.

10. The method of claim 8, wherein the four-dimensional function includes a viewing direction.

11. One or more device-readable storage media storing device-executable instructions for performing steps on a processor, the steps comprising:
    accessing a base volume stored in the memory, the base volume comprising a volumetric sample of a translucent material being modeled, the base volume comprising voxels that represent translucence properties of the material being modeled;
    accessing a mesh model stored in the memory;
    mapping the base volume to the mesh model to form a two-layered model stored in the memory, the two-layered model comprising a shell and a core;
    defining a shell radiance texture function (SRTF) to record an outgoing radiance from the base volume, the SRTF being defined by computing sample values from light rays passing through the base volume from various directions;
    precomputing radiance values of the core using the SRTF and storing the radiance values of the core in the memory; and
    computing surface radiance of the two-layered model by using the precomputed radiance values to compute surface radiance of the two-layered model and rendering the two-layered model using the surface radiance.

12. The one or more device-readable storage media of claim 11, wherein precomputing radiance values of the core comprises precomputing radiance from light scattered within the shell.

13. The one or more device-readable storage media of claim 12, wherein precomputing radiance from light scattered within the shell comprises precomputing a six-dimensional function that depends on a position of a sampling point, a viewing direction, and a lighting direction.

14. The one or more device-readable storage media of claim 11, wherein precomputing radiance values of the core comprise precomputing radiance from light scattered from the core.

15. The one or more device-readable storage media of claim 14, wherein precomputing radiance from light scattered from the core comprises precomputing a four-dimensional function that depends on a position of a sampling point and a viewing direction.

16. The one or more device-readable storage media of claim 14, wherein precomputing radiance from light scattered from the core comprises precomputing a core radiance.

17. A method performed by a computing device comprising a processor and memory, the method comprising:
   accessing a base volume stored in the memory, the base volume comprising a volumetric sample of a translucent material being modeled, the base volume comprising voxels that represent geometry and translucence properties of the material being modeled;
   accessing a mesh model stored in the memory;
   synthesizing the base volume onto the mesh model to form a two-layered model stored in the memory, the two-layered model comprising a shell and a core;
   precomputing, by the processor, by sampling light rays passing through the base volume from various directions, shell radiance texture function (SRTF) values to represent outgoing radiance from the base volume, where the SRTF values are aligned with the shell of the two-layered model, where the SRTF values record translucency effects of the base volume on the light rays, and where the SRTF values and the base volume are stored in the memory and accessed therefrom by the processor;
   precomputing, from the two-layered model, core radiance comprising radiance of the core, and storing the core radiance in the memory; and
   computing surface radiance of the two-layered model based on light incident to the two-layered model, based on the SRTF values, and based on the precomputed core radiance stored in the memory, and using the surface radiance to render the two-layered model.

18. The method of claim 17, wherein synthesizing the base volume onto the mesh comprises assigning the precomputed SRTF values to the mesh via an assigning of texture coordinates to points of the mesh.

19. The method of claim 18, wherein the rendering comprises combining shell radiance contributions and core radiance contributions using the precomputed SRTF values and the precomputed core radiance.

* * * * *